United States Patent
Bouamra (12) 
(10) Patent No.: US 6,511,222 B1
(45) Date of Patent: Jan. 28, 2003

(54) TEMPERATURE SENSOR WITH OPTICAL FIBRE

(75) Inventor: Mohamed Bouamra, Saint Jean de Luz (FR)

(73) Assignee: Talltec Technologies Holdings S.A., Luxembourg (LU)

( * ) Notice: Subject to any disclaimer, the term of this patent is extended or adjusted under 35 U.S.C. 154(b) by 0 days.

(21) Appl. No.: 09/786,327

(22) PCT Filed: Sep. 3, 1999

(86) PCT No.: PCT/EP99/06499
§ 371 (c)(1),
(2), (4) Date: Apr. 30, 2001

(87) PCT Pub. No.: WO00/14498
PCT Pub. Date: Mar. 16, 2000

(30) Foreign Application Priority Data

Sep. 4, 1998 (EP) .............................................. 98116774

(51) Int. Cl.$^7$ .......................... G01K 11/00; G01K 1/16; G01J 5/00; G01J 1/04; G02B 6/02
(52) U.S. Cl. ........................ 374/161; 374/137; 374/120; 385/12; 250/227.14
(58) Field of Search .................................. 374/137, 120, 374/161; 385/12; 250/227.14, 227.16, 227.18, 227.23, 227.24, 238; 340/555, 556, 557, 568.2, 541; 358/43

(56) References Cited

U.S. PATENT DOCUMENTS

| | | | |
|---|---|---|---|
| 4,151,747 A | | 5/1979 | Gottlieb et al. |
| 4,203,326 A | * | 5/1980 | Gottlieb et al. ............ 73/339 R |
| 4,818,975 A | * | 4/1989 | Jenkins ........................ 340/584 |
| 5,035,511 A | * | 7/1991 | Berthold ...................... 374/124 |
| 5,118,931 A | * | 6/1992 | Udd et al. .............. 250/227.16 |
| 5,134,281 A | * | 7/1992 | Bryenton et al. ...... 250/227.16 |
| 5,258,614 A | | 11/1993 | Kidwell et al. |
| 5,290,103 A | * | 3/1994 | Fevrier et al. ............... 374/131 |
| 5,555,086 A | * | 9/1996 | Von Bieren et al. ......... 356/345 |
| 5,672,008 A | * | 9/1997 | Bonniau et al. ............. 374/161 |

FOREIGN PATENT DOCUMENTS

| | | | | |
|---|---|---|---|---|
| EP | 108671 | | 5/1984 | |
| FR | 2664695 | | 1/1992 | |
| GB | 2252402 | | 8/1992 | |
| JP | 0079928 | * | 6/1981 | .................. 374/161 |
| JP | 5779416 A | * | 5/1982 | .................. 374/161 |
| JP | 0129127 | * | 5/1989 | .................. 374/161 |
| SU | 0922538 | * | 4/1982 | .................. 374/161 |

OTHER PUBLICATIONS

Patent Abstracts of Japan, vol. 006, No. 162, Aug. 25, 1982 & JP 57 079415, May 18, 1982.
Patent Abstracts of Japan, vol. 007, No. 075, Mar. 29, 1983 & JP 58 006431, Jan. 14, 1983.

* cited by examiner

*Primary Examiner*—Diego Gutierrez
*Assistant Examiner*—Gail Verbitsky
(74) *Attorney, Agent, or Firm*—Sughrue Mion, PLLC

(57) ABSTRACT

The invention concerns a temperature sensor including an optical fiber source (10, 30) for supplying an optical signal, a first fiber optic transmission line (12, 32) connected to the optical source, a sensitive optical fiber portion (14, 34) connected to the fiber optic transmission line, a second fiber optic transmission line (16, 36) connected to the sensitive portion of the optical fiber, and an optical detection and processing circuit (18, 38) connected to the second fiber optic transmission line for receiving and analysing the optical signal transmitted by the optical source and passing through the optical fiber, said sensor being characterised in that said sensitive optical fiber portion is mounted on a plane support and bent over a determined length (N1) and with a determined amplitude of curvature (A1).

30 Claims, 3 Drawing Sheets

TEMPERATURE SENSOR WITH OPTICAL FIBRE

The present invention relates to the field of temperature sensors and concerns more particularly a compact optical fibre temperature sensor.

Currently, optical fibre temperature sensors are divided into two categories: the first category concerns so-called extrinsic optical sensors and the second those called intrinsic optical sensors. In extrinsic optical sensors, the optical fibre is a passive element assuring a simple transmission line function and it must therefore be perfectly insensitive to the physical variable to be measured. Conversely, for intrinsic optical sensors, it is the optical fibre itself which is the element sensitive to the variable to be measured, which acts directly on the actual physical characteristics of the fibre.

There is known, in particular from French Patent No. 2 664 695, an optical fibre temperature sensor of the intrinsic type wherein the multimode type optical fibre which includes an outward connection length (from the optical source) and a return connection length (to the detection and exploitation circuit) is formed in its sensitive portion in a winding of determined curvature with several turns in the medium to be monitored. This sensors relies on the birefringence properties of a curved optical fibre. It is known that the curvature of a fibre, by inducting stress in the fibre, causes losses and thus a drop in the luminous intensity transmitted.

However, such a temperature sensor also has numerous drawbacks. First of all, the configuration of the sensitive portion of the optical fibre, wound over several turns, influences the space requirement and lifetime of the sensor. Each optical fibre in fact has a critical radius of curvature Rc for which the fibre will fracture (for example for an entirely silica fibre with an external radius r, this critical radius of curvature is equal to 100 r/3.3). Hence, the space requirement of the sensor is imposed by this minimum dimension and the lifetime of the sensor will be shorter the closer the winding diameter is to this critical fracture diameter. Further, the use of a multimode fibre generates particularly severe exploitation conditions. Indeed, a fibre of this type includes a large number of propagation modes, which greatly depend both on the optogeometrical properties of the fibre (refraction index and core radius, refraction index profile, numerical aperture), on the initial injection conditions of the optical source (solid angle and emitted wavelength source-fibre distance, axial and angular alignment), on the conditioning of the transmission line (rectilinear or curved path), and on the surrounding temperature. Hence, it is very difficult to obtain identical modal distributions from one sensor to another. Finally, in such curved optical guides, the temperature response is directly linked to the modal distribution at the input end of the fibre and it is assumed that only the first curvature lengths efficiently contribute towards generating losses, the losses virtually stabilising beyond a certain length.

The present invention thus concerns a compact optical fibre temperature sensor which nonetheless has great linearity and a large measuring range, and is arranged so as to permit industrial exploitation.

These objects are achieved by an optical fibre temperature sensor including an optical source for supplying an optical signal, a first fibre optic transmission line connected to the optical source, a sensitive portion of the optical fibre connected to the first fibre optic transmission line, a second fibre optic transmission line connected to the sensitive portion of the optical fibre, and an optical detection and processing circuit connected to the second fibre optic transmission line to receive and analyse the optical signal transmitted by the optical source and passing through the optical fibre, characterised in that said sensitive portion of the optical fibre is mounted on a plane support and bent over a determined length (N1) and with a determined curvature amplitude (A1). Preferably, the sensitive portion is periodically bent (T1).

Via this particularly simple structure wherein the sensitive portion of the optical fibre is shaped in an optical guide having perfectly determined characteristics, it is possible to obtain particularly precise temperature measurements. Moreover, the use of an optical fibre offers such a sensor complete immunity as regards perturbation of electromagnetic origin and complete security in a sensitive, and particularly an explosive, medium.

In an alternative embodiment, a second transmission line can be omitted from this optical fibre temperature sensor and replaced by a plane reflective element directly connected to the sensitive optical fibre portion, which is mounted on a plane, periodically bent (T1) support over a determined length (N1) and with a determined curvature amplitude (A1).

Depending on the optical fibre employed to form the sensitive portion, the period of curvature T1 is selected so as to satisfy either the following inequality:

$2\pi T1 \geq 1/\rho^2 k n_1 + 2\sqrt{\Delta}/\rho$ for a step index fibre, or the following equality:

$T1 = \rho \pi \sqrt{(2/\Delta)}$ for an optical fibre with parabolic index profile, where $K = 2\pi/\lambda$ is the module of the wave vector and $\lambda$ the optical wavelength;

$n1$ is the refraction index of the core material of the optical fibre;

$\Delta = n_1 - n_2/n_2$ is the relative difference of the refraction indices of the core and cladding materials of the optical fibre; and $\rho$ is the optical fibre core radius.

According to a preferred embodiment, the sensitive portion of the optical fibre of the temperature sensor according to the invention is preceded and followed by a section of fibre, respectively upstream and downstream, mounted on a plane support and periodically bent (T2, T3) over a determined length (N2, N3) and with a determined amplitude of curvature (A2, A3). Preferably, these determined lengths of the upstream and downstream sections of optical fibre are identical.

The determined periods of curvature of the upstream and downstream sections of optical fibre are determined so as to obtain optimum coupling between all the trapped modes without causing coupling with the radiated modes.

Advantageously, the optical fibre is a multimode fibre and is formed of core and cladding materials (including an outer cladding) of decreasing refraction indices. It is surrounded, at its sensitive portion, by at least one additional layer of a material having a lower refraction index than that of the outer cladding and with different optical properties as regards temperature to those of the optical fibre core. According to a first embodiment, the layer of additional material may have an optical index which decreases with temperature when the core material itself has an optical index which is constant or increases with temperature. According to a second embodiment, this layer of additional material may have an optical index which increases with temperature when the core material itself has an optical index which is constant or decreases with temperature.

Preferably, the first and second fibre optic transmission lines are interlaced to form a network of bends of low amplitude and determined period. This determined period is selected so as to obtain optimum coupling between the trapped modes, without causing coupling between the radiated modes.

Advantageously, the optical source is selected from among the following three sources: a coherent light source of the laser type, a partially coherent light source of the superluminescent diode type, or a slightly coherent light source of the luminescent diode type.

The first and second fibre optic transmission lines preferably form a single optical fibre. However, these first and second fibre optic transmission lines may also be formed of two distinct optical fibres connected by an optical guide forming the sensitive optical fibre portion.

The present invention also concerns a temperature measuring device provided with two temperature sensors such as described hereinbefore, these two sensors arranged close to each other being supplied by a common optical source and each supplying an optical output signal respectively at first and second detectors. In a first embodiment, the sensitive optical fibre portion of one of these two sensors is made insensitive to temperature in order to allow a substantially temperature constant signal to be supplied to the corresponding detector. In a second embodiment, the sensitive optical fibre portions of these two sensors have materials with temperature index variation coefficients of opposite signs, in order to allow optical signals having opposite temperature variations to be supplied to the first and second detectors, the sum of these two signals constituting a substantially temperature constant reference signal. This second embodiment allows, in particular, a reference to be obtained in order to avoid environmental perturbations.

The invention also relates to a temperature measuring device provided with a first temperature sensor according to the aforecited structure with an optical source, an outward transmission line, a single loop sensitive portion, a return transmission line and a first detector, this first sensor being intended to co-operate with a second temperature sensor whose sensitive portion is arranged in immediate proximity to the sensitive portion of the first sensor, so as to pick up all or part of the radiating luminous light emitted in proximity to said single loop and to direct it towards a second detector by means of one or more optical transmission lines, the optical signals reaching the first and second detectors having opposite temperature variations. Consequently, the pondered sum of these two signals can constitute a substantially temperature constant reference signal. Analysis of the variation signs of the two signals detected also allows effects due to temperature to be distinguished from other perturbation. Thus, any same sign variation in the two signals generated by the sensors will be attributed to effects which are unconnected to the variable to be measured. This is what happens when the transmission cable is subjected to bends causing a simultaneous drop in the output signal of the two sensors. This is also the case when the intensity of the source fluctuates. After digitising and computer processing of the signals, corrections can be made by acting on the optical source, on the signal amplification circuits or, even better, by using an appropriate algorithm. The two signals may also be subjected to arithmetical operators giving a ratiometric type result. This result can be obtained by using analogue operators or by computer processing.

In a first embodiment, the sensitive portions of the first and second sensors are bent according to radii close to one another, the two free ends of the receiving fibre being connected to a second detector via optical transmission lines. In a second embodiment, this sensitive portion of the second sensor is straight and arranged as close as possible to the sensitive portion of the first sensor, its opposite end being connected to a second detector via an optical transmission line.

In both these cases, the temperature measuring device can further include an additional optical device inserted between the sensitive portions of the two sensors and performing the function of a light concentrator, in order to increase the light transfer efficiency from the first sensor to the second sensor. This additional optical device is advantageously formed of a material whose index of refraction is close to that of the optical cladding coating the fibre core of the second sensor and slightly greater than the refraction index of the material of the optical cladding coating the core of the first sensor. In the aforecited first embodiment, this additional device has a half ring shape with a small cross-section, so as to be able to be inserted between the two bent sensitive portions of the first and second sensors. In the aforecited second embodiment, it has the shape of a circle quadrant with a rounded base of the same curvature as the sensitive portion of the first sensor, and a pointed top which comes into contact with the sensitive portion of the second sensor.

Finally, the present invention finds application with a temperature measuring device provided with a temperature sensor of the aforecited reflective type including an optical source, a fibre optic transmission line, a sensitive optical fibre portion, a plane reflective element and a first detector, this sensor further including a diffraction grating placed just in front of the sensitive portion of the optical fibre to cause part of the spectrum of the optical signal emitted by the optical source to reflect back as a reference signal a portion of the spectrum of the optical signal transmitted by the optical source, a plane diffractive element arranged just in front of this optical source allowing this reference signal to be directed towards a second detector and the optical measuring signal being directed towards the first detector after also having passed through this plane diffractive element. Preferably, the optical source is of the spatially coherent type such as a laser diode or a superluminescent diode.

Other characteristics and advantages of the present invention will appear from the following description, made by way of indicative and non-limiting example, with reference to the annexed drawings in which.

Figure 1:
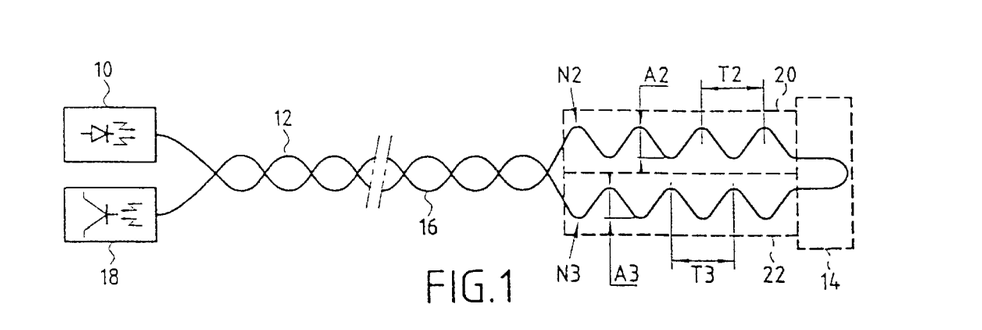
FIG. 1 is a first embodiment example of an optical temperature sensor according to the invention.

A first embodiment example of a temperature sensor according to the invention is illustrated in FIG. 1. This sensor includes an optical source 10, an outward fibre optic transmission line 12, a sensitive optical fibre portion 14, a return fibre optic transmission line 16 and a detection and processing circuit 18. The outward and return transmission lines and the sensitive portion are advantageously formed in a single optical fibre. However, these transmission lines may also be formed of two distinct optical fibres connected to the sensitive portion then formed by an optical guide.

Optical source 10 for emitting an optical signal may be a spatially coherent light source of the laser type, or simply partially coherent of the superluminescent diode type, or even slightly coherent of the luminescent diode type.

Outward transmission line 12 is formed by a multimode optical fibre made intrinsically temperature insensitive because of the substantial equality (in amplitude and sign) of the temperature index variation coefficients of the constituent core and cladding materials of the optical fibre. This condition is fulfilled in particular with a conventional fibre called an "all silica" fibre whose core and cladding materials are formed of a same material. Preferably, in order to assure better modal excitability and to avoid as far as possible the injection conditions at the optical source, this fibre is selected to be of the parabolic index profile type. However, the use of a step index fibre may also be envisaged. Likewise, in order to avoid the use of optical connectors or couplers with microlenses which have the drawback of poor reproducibility when dismantled/reassembled, one end of this transmission line is fixedly secured to optical source 10, for example by bonding by after a melting process, and possibly through a collimating device (not shown).

Return transmission line 16 has a similar configuration to that of the outward line, one end of this line then being fixedly secured to detection element 18, possibly through a focusing device (not shown).

Advantageously, the two outward and return transmission lines are interlaced with each other so as to form a network of bends of low amplitude (to limit losses due to the fibre radiated modes) and of a period selected so that all the propagation modes guided by the optical fibre are excited. Optimum coupling of these guided modes is thus accomplished and one can then speak of steady state distribution of modes. The set source-outward transmission line and detection element-return transmission line can be mounted in a case and then bonded and fixed to a common electronic processing board.

The detection and processing circuit 18 includes an optoelectronic photodetector element for converting the received optical signal into an electric signal (for example a phototransistor or a photodiode) and electronic processing elements for this signal to deduce the temperature to be evaluated. Of course, as will be seen hereinafter, the sensor will be given a reference at its processing elements to avoid the various interfering factors able to interfere with the measurements such as the effect of bends on the transmission lines, the various fluctuations of thermal origin or undesired temperature variations in the transmission lines for example.

The sensitive optical fibre portion 14 intended to assure temperature measurement by contact or immersion in the medium to be monitored is formed by a multimode guide and arranged along a network of bends of plane structure with zero deformation stress.

The propagation constant of a mode $\beta$ in any multimode optical fibre, defined by its two integer parameters $\mu$ and $\nu$ respectively describe the radial and azimuthal dependence of the electromagnetic field associated therewith, answers the following equation:

$$\beta_{\mu,\nu} = kn_1[1-2\Delta[\alpha+2/\alpha*(2\mu+\nu)/(\rho^2 k^2 n_1^2 \lambda)]^{\alpha/\alpha+2}]^{0.5}$$

where $k=2\pi/\lambda$ is the wave vector module and $\lambda$ the optical wavelength;

$n_1$, the refraction index of the core material of the optical fibre;

$\Delta=n_1-n_2/n_2$ is the relative difference of the refraction indices of the core and cladding materials of the optical fibre;

$\alpha$ is a coefficient which defines the spatial profile of the refraction index of the fibre ($\alpha=2$ corresponds to a fibre with parabolic index profile), and $\rho$ is the core radius of the optical fibre.

The boundary conditions imposed on the trapped modes must satisfy the relation:

$$0 < (2\mu+\nu)^2 < \Delta(\rho k n_1)^2 \alpha/\alpha+2$$

The presence of a fault having a periodicity T such that:

$$\Delta\beta = 2\pi/T$$

may couple two modes or groups of modes satisfying the selection rule linked to coupling to the nearest neighbour.

Thus, for a step index fibre ($\alpha \to \infty$), the space between the neighboring modes is given by:

$$\Delta\beta_{(\mu,\nu)(\mu,\nu+1)} = 1/(\rho k n_1)^2[1+2(2\mu+\nu)]$$

hence the terminals of the guided modes:

$$1/\rho^2 k n_1 \leq \Delta\beta \leq 1/\rho^2 k n_1 + 2\sqrt{\Delta}/\rho$$

Thus, if a periodic mechanical fault of frequency $2\pi/T$ is applied to a step index optical fibre, one may observe:

either no coupling if:

$$2\pi/T \leq 1/\rho^2 k n_1$$

or a coupling only between the guided modes if:

$$1/\rho^2 k n_1 \leq 2\pi/T \leq 1/\rho^2 k n_1 + 2\sqrt{\Delta}/\rho \quad (1)$$

or a coupling between guided modes and radiated modes if:

$$2\pi/T \leq 1/\rho^2 k n_1 + 2\sqrt{\Delta}/\rho \quad (2)$$

In the case of an optical fibre with parabolic index profile ($\alpha=2$), the space between modes is independent of their order. Thus, any fault of period T will couple all the guided propagation and radiated modes with an intensity linked in particular to the amplitude of this fault (adoption of multiple microbend pitch of T allows attenuation peaks to be obtained):

$$\Delta\beta_{(\mu,\nu)(\mu,\nu+1)} = 2\pi/T = \sqrt{(2\Delta)}/\rho$$

or further $$T = \rho\pi\sqrt{(2/\Delta)} \quad (3)$$

where $\Delta=n_1-n_2/n_2$ is the relative difference of the refraction indices of the core and cladding materials of the optical fibre, and p is the core radius of the optical fibre.

Figure 2:
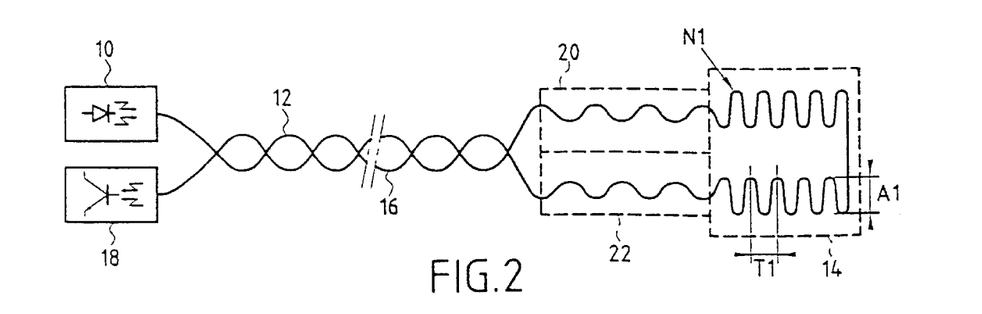
FIG. 2 shows an alternative embodiment of the sensor of FIG. 1.

Application of equations (2) or (3) allows the period of microbends T1 and the amplitude of the deformations of network A1 to be defined as a function of the sensitivity and range of measurements required. The number N1 of the network periods is essentially defined by the contact surface available with the medium to be monitored. As a minimum, in particular in the case of a punctual measurement as illustrated in FIG. 1, this number could be less than the unit, a half-period being able to suffice to form the sensitive portion of the sensor and to obtain a return half-loop necessary for connection to the return transmission line. FIG. 2 is another sensor example wherein the sensitive portion includes six periods, the upstream and downstream sections each having three periods.

Two techniques for making the sensitive portion of the optical fibre may currently be envisaged. A first known technique consists in creating a specific optical guide by integrating the optical fibre directly in a previously shaped silicon or glass substrate. The second technique uses a heat shaping process for the optical fibre. This process may be inserted either in the manufacturing cycle of the optical fibre or during elaboration of the sensitive portion of the sensor. In the latter case, the fibre is stripped of its mechanical coating over a certain length and possibly also of its optical cladding or claddings then secured to a plane support provided with pre-established bends. The assembly is then brought to a sufficient temperature to assure softening of the materials, then, once the fibre has taken its microbent shape, this stripped portion is coated with one or more layers of materials of decreasing refraction indices which are optically compatible with the core refraction index of the fibre, but which have temperature variation properties which are different to those of the core. Preferably, a last material able also to act as a case will give the sensitive portion of the sensor its resistance and its definitive mechanical strength.

It will have been noted that this shaping process allows a microbent optical fibre with zero deformation stress to be obtained, which guarantees a long lifetime for the sensor and frees it of elasto-optical effects.

According to a preferred feature of the invention, the sensitive portion of optical fibre 16 is preceded and followed by two identical sections of optical fibre 20, 22 made insensitive to temperature and also arranged on a plane support according to a determined bend network. The role of the first section, or outward section, is to optimise the modal distribution to obtain a steady state modal distribution at the input end of the sensitive portion and the role of the second section, or return section, is to reconstitute this steady state modal distribution at the output end of this sensitive portion. Thus, it is possible to guarantee identical behaviour of the outward and return transmission lines and thus better response reproducibility of the sensor.

Period T2, T3 is fixed from equation (1) by equalling the terms of the middle and to the right of this inequality thus assuring optimum coupling (without losses) between all the trapped modes in the fibre without causing coupling with the radiated modes. However, since such equality cannot be perfect, coupling may nonetheless occur with the radiated modes, hence the necessity for providing a sufficiently low corresponding amplitude value A2, A3 to limit losses. The number N2, N3 of periods is selected as previously as a function of the available contact surface.

The operation of the temperature sensor according to the invention is based on the principle of intensity modulation (also called amplitude) in an optical fibre. It relies on measurement of the power collected at the output end of the optical fibre which is a function of variations in numerical aperture (ON) via thermal effects.

Thus, temperature measurement can implement two complementary principles: the first results from a positive modulation of the numerical aperture of the optical fibre and the second, opposite, results from a negative modulation of this aperture. The choice of one or the other of these two operating modes will essentially depend on the choice which will be made for the materials forming the optical fibre, more precisely for the variation coefficients as a function of temperature (in value and in sign) of the refraction indices of the core and optical cladding or claddings of the fibre.

Therefore, in order to obtain a positive modulation of the numerical aperture, one need only select an optically transmitting material with a constant refraction index or a refraction index which increases with temperature (for example silica) for the optical fibre core while, for the optical claddings and in particular the outer cladding, one need only select a material with an optical index compatible with the core but decreasing with temperature (for example silicon). In this operating mode of the sensor, an increase in temperature will cause an increase in the numerical aperture, the minimum value of the optical signal corresponding to the extinction thereof being obtained for the lowest operating temperature. Conversely, in order to obtain a negative modulation of the numerical aperture, materials with opposite optical properties to the preceding ones will be selected. In this operating mode, an increase in temperature will cause a decrease in the numerical aperture, the lowest operating temperature thus allowing the maximum value of the optical signal to be obtained corresponding to its saturation.

These two limit temperatures define the range of measurement of the sensor within which the sensor's response can be considered as linear as a function of temperature. It will be noted that calculation of these two low and high temperature limits may be effected simply and very conventionally from the determination of the limit refraction angle of a bent fibre which can be expressed as a function of the radius of curvature of this fibre and the limit refraction angle of a rectilinear fibre.

Of course, prior to any use, the sensor should be calibrated in order to limit measurement errors conventionally linked to the dispersion of characteristics of the components used in the manufacturing of the optical fibre and to their temporal fluctuations. A simple calibrating process could thus be implemented when the sensor is installed in the medium to be monitored, for example by taking a measurement for a given reference temperature to which a calibrated response of the sensor corresponds.

Further, in order to properly avoid variations in the received signal other than those linked to temperature, it is conventional to give a reference to the sensor. Its function is to sense signal variations linked to perturbation other than the effect of temperature to be measured, for example the effects of bends on the transmission lines, pressure or heat deformation of the materials.

Figure 3:
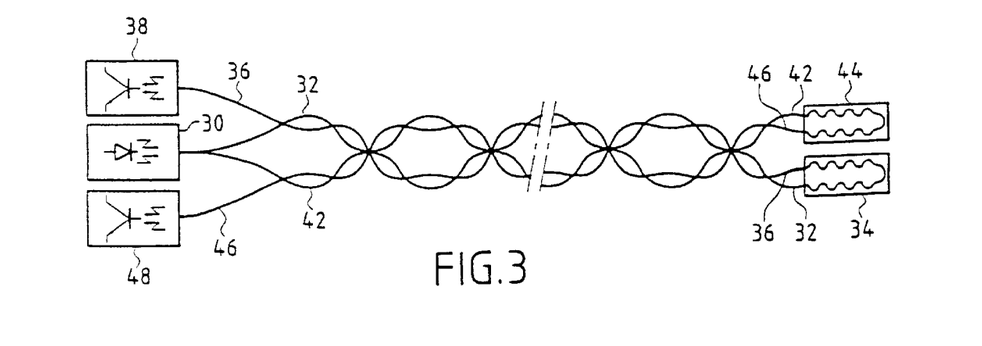
FIG. 3 shows a first measuring configuration example integrating the sensor of FIG. 1.

FIG. 3 illustrates a first example of a resulting temperature measuring device with two identical structures to that of the previously defined temperature sensor supplied by a common optical source 30. It will be recalled that this sensor includes, in addition to this common optical source, a first outward transmission line 32, a first sensitive portion 34, a first return transmission line 36, a first detector 38. Joined to this first sensor there is a second sensor having a second outward transmission line 42 fixedly secured to the common optical source 30, a second sensitive portion 44, a second return transmission line 46 and a second detector 48. Further, the set of transmission lines is formed along periodic interlacing of the optical fibres so as to keep identical modal distributions at every point of these lines.

In a first alternative embodiment, the second sensitive portion 44 which, like transmission lines 32, 36; 42, 46, is made intrinsically insensitive to temperature, constitutes a reference sensor for the measurement which is effected with the first sensitive portion 34 (which is placed in the medium to be monitored). Thus, with this configuration, any variations (perturbation) other than those resulting from temperature which will act in a similar manner on each of the two sensor structures, could be cancelled out by means of a counter-reaction loop (not shown) applied to the optical source. At the output end of the two detectors of the measuring device there will be available on the one hand, a measuring signal, and on the other hand a substantially temperature constant reference signal.

In a second alternative embodiment, the first and second sensitive portions 34, 44 are positioned as close as possible to each other in the medium to be monitored, but the optical fibres forming them are selected with materials having temperature index variation coefficients preferably of the same amplitude but of opposite signs. A suitable choice of the radii of curvature and amplification gains for the two sensors will allow the inherent differences in the materials to compensate for each other and a linear range of measurement to be obtained. At the output end of the detectors there will be available a first measuring signal which increases with temperature (operating in positive modulation) and a second measuring signal which decreases with temperature (operating in negative modulation), the sum of these two signals constituting a substantially temperature constant reference signal. As previously, analysis of the variation signs of the two measuring signals coupled with a counter-reaction loop will allow the effects of temperature to be distinguished from those of other perturbation. Indeed, any same sign variation in the two signals will be attributed to effects not linked to temperature, which is for example the case when the transmission lines are subjected to bends causing a drop in the output signal of the optical fibre or when the intensity of the optical source fluctuates.

Figure 4:
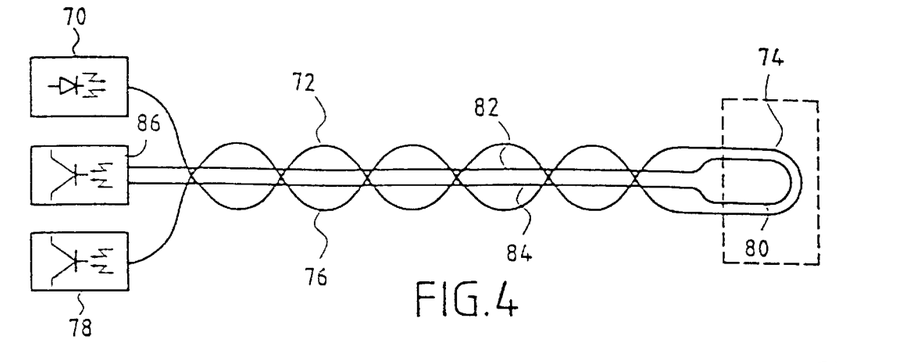
FIG. 4 shows a second measuring configuration example integrating the sensor of FIG. 1.
Figure 6:
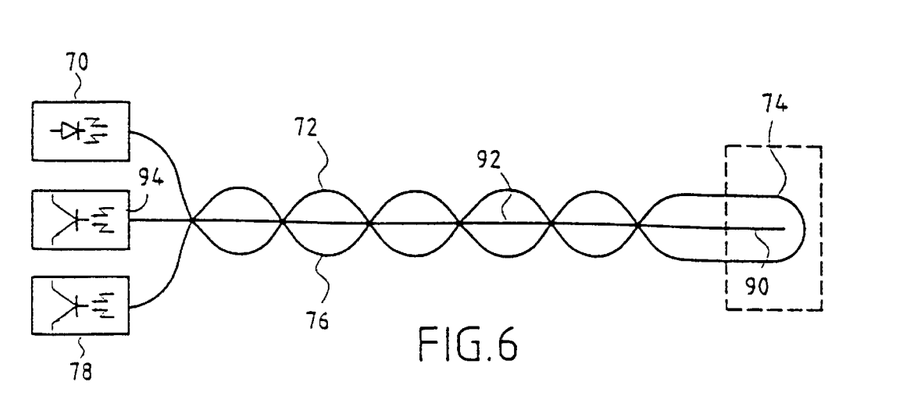
FIG. 6 shows a third measuring configuration example integrating the sensor of FIG. 1.

FIGS. 4 and 6 shows second and third examples of a temperature measuring device integrating on the one hand a first sensor having an identical structure to those illustrated previously, but in a single loop version (as illustrated in FIG. 1), and on the other hand a second sensor intended to co-operate with the first to avoid other effects than temperature effects. The first optical fibre sensor includes an optical source 70, an outward transmission line 72, a sensitive portion with a single loop 74, a return transmission line 76 and a first detector 78. The set of outward and return transmission lines is formed in a periodic interlacing of the optical fibres so as to keep identical modal distributions at every point of these lines. This first sensor is of the microbent positive modulation sensor type with a first signal increasing with temperature. The second sensor is also formed by an optical fibre the sensitive portion of which is arranged in immediate proximity to the sensitive portion of the first sensor so as to pick up all or part of the luminous light radiating from the vicinity of the bend of the single loop. This second sensor operates according to the principle of an antenna responsible for picking up the luminous energy lost by the first sensor. The optical fibre used as an antenna is made intrinsically insensitive to the effects of temperature and is not excited by any optical signal other than that emitted by the sensitive bent portion of the first optical fibre. The picked up signal is then transported, by means of one or more optical transmission lines, to a second detector.

In the configuration of FIG. 4, the emitting fibres (the sensitive portion of first sensor 74) and the receiving fibres (the sensitive portion of the second sensor 80) are bent according to radii close to one another. The two free ends of the receiving fibre are connected via transmission lines 82, 84 to a second detector 86. According to an advantageous first embodiment, the cores of the two fibres are embedded in a material playing the role of a common optical cladding. The transfer of light from one to the other is achieved by diffusion through this optically active material whose index of refraction is slightly lower than the core indices of the two fibres. According to another preferred embodiment, an additional device can be inserted between the two fibres for the purpose of increasing the light transfer efficiency from the first sensor to the second sensor, by collecting and concentrating the light diffused by the material. This device also plays an insulating role such that the receiving fibre can keep is own numerical aperture which is independent of the effects of temperature. This particular arrangement allows proportional signal variations to be obtained between the two sensors.

Figure 5:
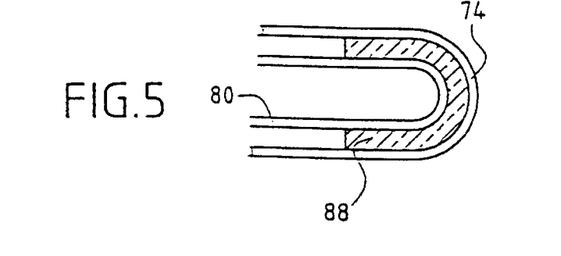
FIG. 5 details the sensitive portion of the optical fibre of FIG. 4.

In its simplest form, and as illustrated in FIG. 5, the constituent material of this additional optical device may be of the glass type with a refraction index close to that of the optical cladding coating the core of the second sensor and slightly greater than the refraction index of the material of the optical cladding coating the core of the first sensor. It thus has a half-ring shape 88 of small transverse cross-section, so as to be able to be inserted between the bent sensitive portions of the two sensors 74, 80.

Figure 7:
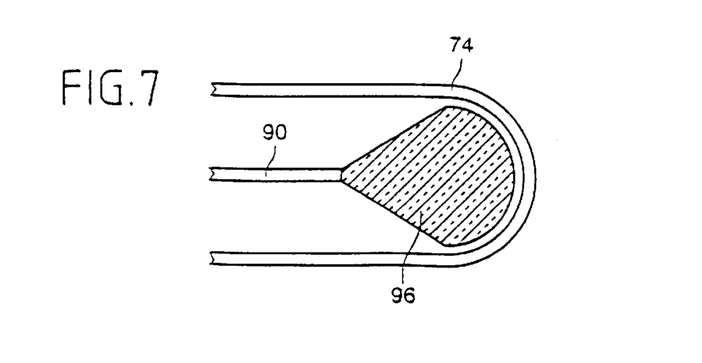
FIG. 7 shows the sensitive portion of the optical sensor of FIG. 6.

In the configuration of FIG. 6, the receiving fibre (the sensitive portion of second sensor 90) is straight and arranged as close as possible to the emitting fibre (the sensitive portion of first sensor 74). Its opposite end is connected to a second detector 94 via a transmission line 92. Likewise, an additional device acting as a concentrator and insulator is provided between the two fibres. The optical properties of the constituent material of this additional optical device are of the same nature as the preceding ones but its geometrical shape, illustrated in FIG. 7, is, however, different. In this second configuration, it has the shape of a quadrant of a circle 96 with a rounded base of the same curvature as the sensitive portion of first sensor 74 and a pointed top which comes into contact with the sensitive portion of second sensor 90.

As in the configuration of FIG. 3, two signals varying in opposite directions with temperature are always available at the output end of the two detectors 78; 86, 94. Consequently, the pondered sum of these two signals can constitute a substantially temperature constant reference signal. On the other hand, when the temperature increases, the optical signal losses, generated around the bent sensitive portion of the first sensor, decrease, causing an increase in the output signal of the first sensor and a decrease in the output signal of the second sensor. The signals originating from the two sensors are greatly correlated and after processing (analogue or digital) allow the actual temperature effect to be distinguished from other effects. Thus, when there is a fluctuation in the energy emitted by optical source 70, there will be simultaneously either an increase, or a decrease in the two output signals of the two sensors. The result is identical in the event of mechanical deformation of the optical transmission lines.

More particularly, in the case of analogue processing, the two signals are subjected to arithmetical operations giving a ratiometric type result in the case of digital processing, these signals are sent beforehand to an analogue/digital converter, a microcontroller being then programmed to make corrections by acting on the source or on the detectors or by means of an appropriate algorithm.

Figure 8:
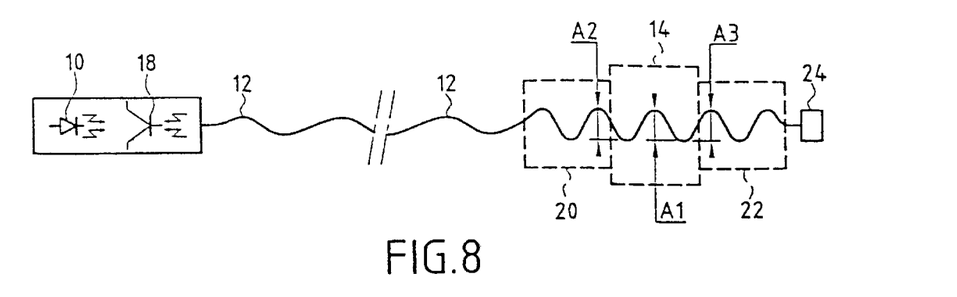
FIG. 8 is a second embodiment example of an optical sensor according to the invention.
Figure 9:
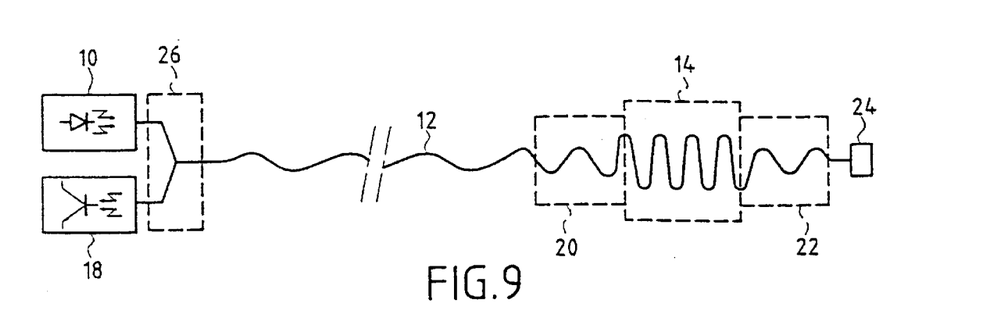
FIG. 9 shows an alternative embodiment of the optical sensor of FIG. 8.

FIG. 8 shows a second embodiment example of an optical fibre temperature sensor according to the invention in a reflection configuration. This sensor again includes the optical source with its emitting diode 10, the outward fibre optic transmission line 12 one end of which is fixedly secured to this optical source, the sensitive portion of optical fibre 14 which extends the transmission line and which is inserted between the two fibre sections 20, 22 and the detection and processing circuit including a photodetector cell 18 and which, in this configuration, can be integrated in the optical source (separation of the emitting diode and photodetector cell is of course possible via the use of a coupler 27 or any other separator device as illustrated by FIG. 9). However, the return transmission line is absent from this configuration and is replaced by a plane reflective element, for example a mirror 24.

This sensor configuration which allows the general space requirement of the sensor and the losses linked to the return line to be reduced, of course allows identical operating modes to those previously described with reference to FIG. 1.

Figure 10:
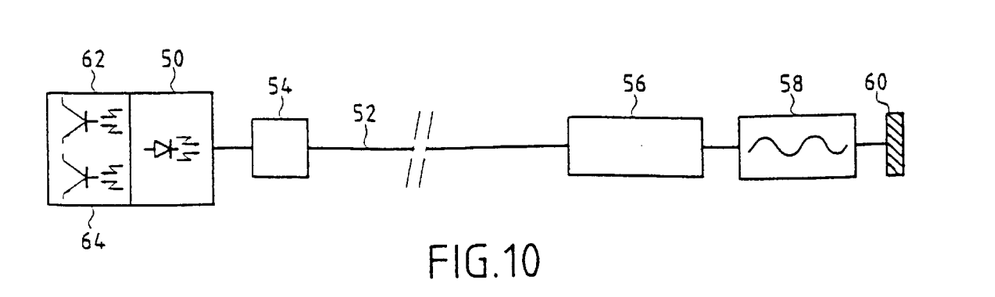
FIG. 10 shows a fourth measuring configuration example integrating the sensor of FIG. 8.

A calibrating device particularly well suited to this reflection configuration is now described with reference to FIG. 10. A spatially coherent optical source 50 (laser or superluminescent diode) is used to inject an optical signal into fibre optic transmission line 52 through a plane diffractive optical element 54. A diffraction grating (for example Bragg grating 56) placed just in front of the sensitive portion of optical fibre 58 causes a portion of the spectrum of the emitted optical signal to be reflected back, said signal being insensitive to the temperature and thus acting as reference signal. The portion of the optical signal transmitted by the diffraction grating will pass twice through sensitive portion 58 because of the presence of mirror 60. The return spectrum signal which is different to the first will then take the same path as the reference signal. Just in front of optical source 50, diffractive optical element 54 will allow the two optical measuring and reference signals to be distinguished, each being detected by a distinct detector 62, 64.

The fibre optic sensor according to the invention has very numerous advantages. Let us cite, for example, very high linearity, a significant measuring range in a temperature range of −200 to 1000° C., very high resolution of the order of $10^{-4}$ °C., very long lifetime, regularly distributed sensitivity because of the constant re-establishment of the modal distributions, great compactness, particularly easy to fix to any support because of the plane structure of the sensitive portion, good repeatability, moderate manufacturing cost and ease of implementation.

It is also to be noted that this structure is particularly well suited to the case in which one seeks to determine a mean temperature value from different zones of the medium to be monitored. One need only place a sensitive portion on each of these zones and connect them to each other by transmission lines, an optical source and a detector being sufficient to assure transmission and reception of the optical signal passing through this network of sensors.

What is claimed is:

1. A first optical fibre temperature sensor including an optical source for supplying an optical signal, a first fibre optic transmission line connected to the optical source, a sensitive portion connected to the first fibre optic transmission line, a second fibre optic transmission line connected to the sensitive portion, and a first optical detector and processing circuit connected to the second fibre optic transmission line for receiving and analyzing the optical signal transmitted by the optical source and passing through said sensitive portion, said sensitive portion of the optical fibre being arranged according to a network of bends over a determined length (N1) and with a determined amplitude of curvature (A1), characterized in that the sensitive portion, formed as a section of optical fibre or integrated optical guide, is intrinsically insensitive to temperature, said sensitive portion of core and cladding materials including an outer cladding of decreasing refraction indices, being covered with at least one additional layer of a material having a lower refraction index than the refraction index of the outer optical cladding of the sensitive portion and with different optical properties, as regards temperature, to those of the core of this sensitive portion, so as to make said portion temperature sensitive via positive or negative modulation of the local numerical aperture of said section of optical fibre or integrated optical guided.

2. Temperature sensor according to claim 1, characterized in that said sensitive optical fibre portion is periodically bent (T1).

3. Optical fibre temperature sensor including an optical source for supplying an optical signal, a first fibre optic transmission line connected to the optical source, a sensitive optical fibre portion (14) connected to the first fibre optic transmission line, a plane reflective element connected to the sensitive optical fibre portion, and first optical detector and processing circuit also connected to the first fibre optic transmission line for receiving and analyzing the optical signal transmitted by the optical source and passing through the sensitive portion before and after reflection by the reflective element, said sensitive optical fibre portion being arranged according to a network of bends over a determined length (N1) and with a determined amplitude of curvature (A1), characterized in that the sensitive portion, which is periodically bent (T1) and shaped as a section of optical fibre or integrated optical guide, is intrinsically temperature insensitive, said sensitive portion, formed of core and cladding material including an outer cladding of decreasing refraction indices, being covered with at least one additional layer of a material having a lower refraction index than the refraction index of the outer optical cladding of the sensitive portion and with different optical properties as regards temperature than those of the core of this sensitive portion, so as to make said portion temperature sensitive by positive or negative modulation of the local numerical aperture of said section of optical fibre or integrated optical guide.

4. Temperature sensor according to claim 1 or 3, characterized in that the section of optical fibre is stripped of its mechanical coating its optical cladding or claddings over a certain length and is covered with the additional layer of optical material.

5. Temperature sensor according to claim 1 or 3, characterized in that said additional layer of material has an optical index which decreases with temperature when the core material itself has a constant optical index or an index which increases with temperature.

6. Temperature sensor according to claim 1 or 3, characterized in that said layer of additional material has an optical index which increases with temperature when the core material itself has a constant optical index or an index which decreases with temperature.

7. Temperature sensor according to claim 2, wherein the sensitive portion is of a step index fibre type, characterized in that said period of curvature is selected so as to satisfy the following inequality:

$$2\pi/T1 \geq 1/\rho^2 k n_1 + 2\sqrt{\Delta}/\rho$$

where $k = 2\pi/\lambda$ is the module of the wave vector and X the optical wavelength;

$n_1$ is the index of refraction of the core material of the optical fibre;

$\Delta = n_1 - n_2/n_2$ is the relative difference of the refraction indices of refraction of the core and cladding materials of the optical fibre; and $\rho$ is the optical fibre core radius.

8. Temperature sensor according to claim 2 or 3, wherein the sensitive portion has a parabolic index profile, characterized in that said period of curvature is selected so as to satisfy the following equality (or multiple values of this equality):

$$T1 = \rho \pi \sqrt{(2/\Delta)}$$

where $\Delta = n_1 - n_2/n_2$ is the relative difference of the indices of the core and cladding materials of the optical fibre; and $\rho$ is the optical fibre core radius.

9. Temperature sensor according to claim 1 or 3, characterized in that said sensitive portion of the optical fibre is preceded and followed by a section, respectively upstream and downstream, of intrinsically temperature insensitive fibre section and arranged according to a network of periodic bends (T2, T3) of plane structure over a determined length (N2, N3) and with a determined amplitude of curvature (A2, A3).

10. Temperature sensor according to claim 2, characterized in that said determined lengths of the upstream and downstream optical fibre sections are identical.

11. Temperature sensor according to claim 9, characterized in that said determined periods of curvature of the upstream and downstream optical fibre sections are determined so as to obtain optimum coupling between all the trapped modes without causing coupling with the radiated modes.

12. Temperature sensor according to claim 1 or 3, characterized in that the first and second fibre optic transmission lines and the sensitive optical fibre portion form a single optical fibre.

13. Temperature sensor according to claim 12, characterized in that said sensitive portion is formed by a multimode fibre.

14. Temperature sensor according to claim 1, characterized in that said first and second fibre optic transmission lines are interlaced to form a network of bends of small amplitude and determined period.

15. Temperature sensor according to claim 14, characterized in that said determined period is selected so as to obtain optimum coupling between all the trapped modes without causing coupling with the radiated modes.

16. Temperature sensor according to claim 1 or 3, characterized in that said optical source is selected from among the following three sources: a coherent light source of the laser type, a partially coherent light source of the superluminescent diode type, or a slightly coherent light source of the luminescent diode type.

17. Temperature sensor according to claim 1, characterized in that said optical source is fixedly secured to one end of the first fibre optic transmission line and said detection element is fixedly secured to one end of the second fibre optic transmission line.

18. Temperature sensor according to claim 1 or 3, characterized in that the first and second fibre optic transmission lines are formed of two optical fibres connected by an integrated optical guide forming the temperature sensitive portion.

19. Temperature sensor according to claim 1 or 3, characterized in that the microbent optical fibre has zero deformation stress.

20. Temperature measuring device provided with two temperature sensors, each according to claim 1, these two sensors arranged close to each other being supplied by said optical source which is common for the two sensors and each supplying an optical output signal respectively at first and second detectors, the optical fibre portion of one of these two sensors being temperature insensitive in order to allow a substantially temperature constant reference signal to be supplied to the corresponding detector.

21. Temperature measuring device provided with two temperature sensors, each according to claim 1, these two sensors arranged close to each other in the medium to be monitored being supplied by a common optical source and each supplying an optical output signal respectively at first and second detectors, the sensitive optical fibre portions of these two sensors having materials with temperature index variation coefficients of opposite signs in order to allow optical signals having opposite temperature variations to be supplied to the first and second detectors, the sum of these two signals constituting a substantially temperature constant reference signal.

22. Temperature measuring device provided with the first temperature sensor according to claim 1, wherein said sensitive portion of the first temperature sensor is a single loop sensitive portion, the first temperature sensor being intended to cooperate with a second temperature sensor, a sensitive portion of which is arranged in immediate proximity to the sensitive portion of the first temperature sensor, so as to pick up all or part of the radiating light transmitted in proximity to said single loop and to direct it towards a second detector by means of one or more transmission lines, the optical signals reaching the first and second detectors having opposite signs temperature variations.

23. Temperature measuring device according to claim 22, characterized in that the sensitive portion of the second sensor are bent according to radii close to one another, the two free ends of the receiving fibre being connected via optical transmission lines (82, 84) to the second detector.

24. Temperature measuring device according to claim 22, characterized in that the sensitive portion of the second sensor is straight and arranged as close as possible to the sensitive portion of the first sensor, its opposite end being connected to a second detector via an optical transmission line.

25. Temperature measuring device according to claims 23 or 24, characterized in that it further includes an additional optical device inserted between the sensitive portions of the first and the second sensors and acting as a light concentrator, in order to increase the light transfer efficiency from the first sensor to the second sensor.

26. Temperature measuring device according to claim 25, characterized in that said additional optical device is formed of a material whose index of refraction is close to that of the optical cladding covering the fibre core of the second sensor and slightly greater than the refraction index of the optical cladding material covering the core of the first sensor.

27. Temperature measuring device according to claim 23, characterized in that said additional device has a half-ring shape of small transverse cross-section, so as to be able to be inserted between the two bent sensitive portions of the first and second sensors.

28. Temperature measuring device according to claim 24, characterized in that said additional device has the shape of a quadrant of a circle with a rounded base of the same curvature as the sensitive portion of the first sensor and a pointed top which comes into contact with the sensitive portion of the second sensor.

29. Temperature measuring device provided with the temperature sensor according to claim 3, said sensor further including a second detector, a diffraction grating placed just in front of the sensitive portion of the optical fibre to cause a part of the spectrum of the optical signal emitted by the optical source to be reflected back as a reference signal, a plane diffractive element arranged just in front of this optical source allowing this reference signal to be directed towards the second detector and the optical measuring signal being directed towards the first detector after also being passed through this plane diffractive element.

30. Temperature measuring device according to claim 29, characterized in that said optical source is of a spatially coherent type such as a laser diode or a superluminescent diode.

* * * * *